(12) United States Patent
Ollig et al.

(10) Patent No.: US 11,845,686 B2
(45) Date of Patent: Dec. 19, 2023

(54) APPARATUS FOR FORMING GLASS TUBES, A HEATING CHAMBER AND A PROCESS FOR THE MANUFACTURE OF AN APPARATUS FOR FORMING GLASS TUBES

(71) Applicant: SCHOTT AG, Mainz (DE)

(72) Inventors: Markus Ollig, Weiden (DE); Arne Riecke, Waldsassen (DE); Volker Trinks, Mitterteich (DE); Rainer Eichholz, Frankfurt (DE); Ulrich Lange, Mainz (DE); Sebastian Stark, Mitterteich (DE); Stephan Tratzky, Mitterteich (DE); Rainer Schmid, Mitterteich (DE); Wassilis Bagaris, Mitterteich (DE); Reinhard Gmeiner, Leonberg (DE)

(73) Assignee: SCHOTT AG, Mainz (DE)

( * ) Notice: Subject to any disclaimer, the term of this patent is extended or adjusted under 35 U.S.C. 154(b) by 25 days.

(21) Appl. No.: 17/368,563

(22) Filed: Jul. 6, 2021

(65) Prior Publication Data
US 2022/0204380 A1 Jun. 30, 2022

(30) Foreign Application Priority Data
Jul. 2, 2020 (EP) .................................... 20183650

(51) Int. Cl.
*C03B 17/04* (2006.01)
*C03B 7/04* (2006.01)

(52) U.S. Cl.
CPC ...................................... *C03B 7/04* (2013.01)

(58) Field of Classification Search
CPC ...................................................... C03B 17/04
USPC ............................................................ 65/187
See application file for complete search history.

(56) References Cited

U.S. PATENT DOCUMENTS

| 2,972,837 A | 2/1961 | Pinotti |
| 3,360,353 A | 12/1967 | Torok |

FOREIGN PATENT DOCUMENTS

| CN | 113620595 A | * 11/2021 | ............. A61J 1/065 |
| DE | 1198019 | 8/1965 | |
| DE | 19960211 | 7/2001 | |
| EP | 1283194 | 2/2003 | |
| JP | 2009234873 | 10/2009 | |
| JP | 2009292681 | 12/2009 | |

* cited by examiner

*Primary Examiner* — Christopher M Raabe
(74) *Attorney, Agent, or Firm* — Ruggiero McAllister & McMahon LLC

(57) ABSTRACT

An apparatus for forming glass tubes is provided. The apparatus includes a Danner-pipe, a heating device, and a heating chamber having the Danner-pipe and the heating device arranged therein. The Danner-pipe is inclined with respect to a horizontal plane by a Danner-angle. The heating device is inclined with respect to the horizontal plane by a heating-angle. The Danner-angle and/or the heating angle are in a range of 1° to 45°.

19 Claims, 4 Drawing Sheets

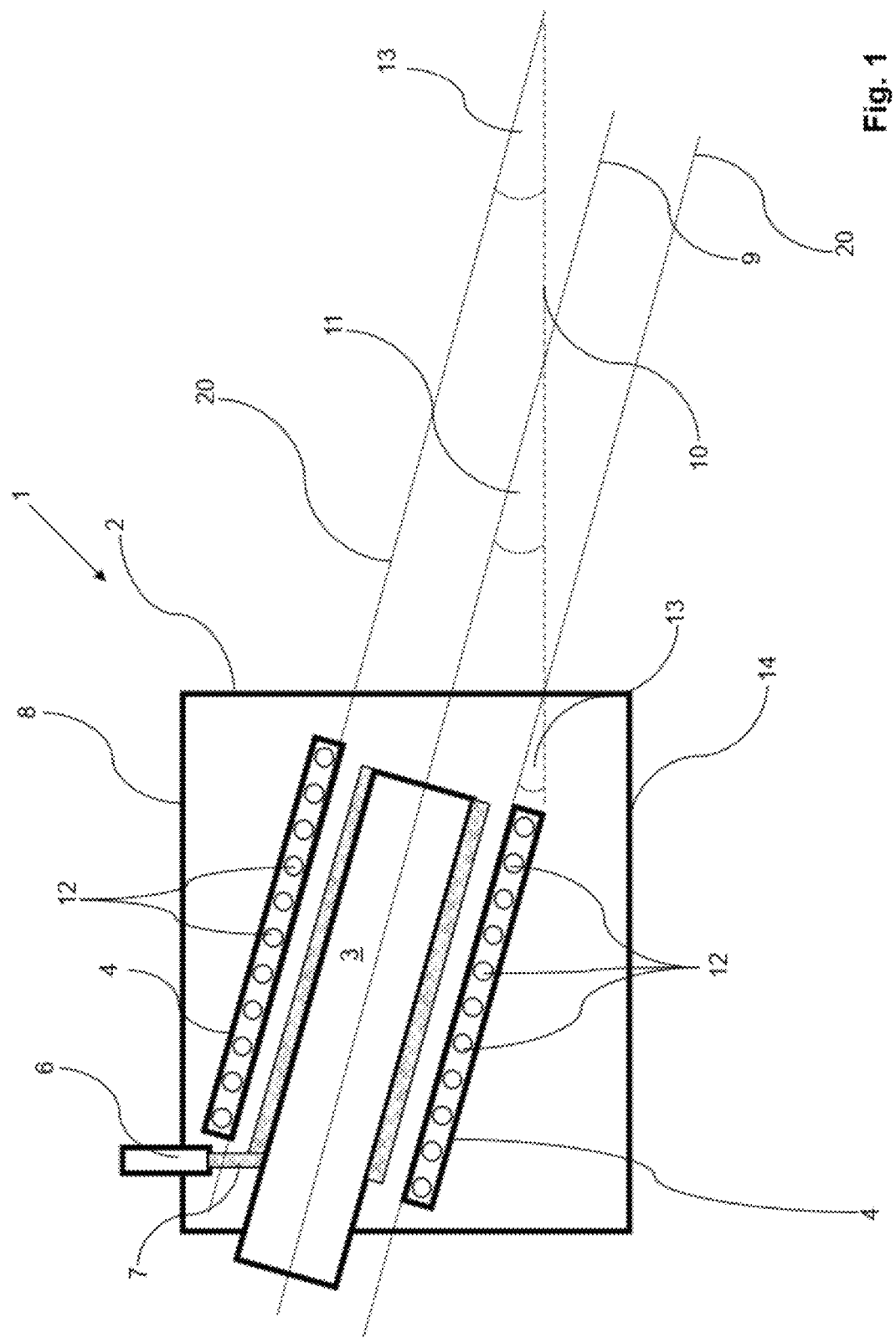

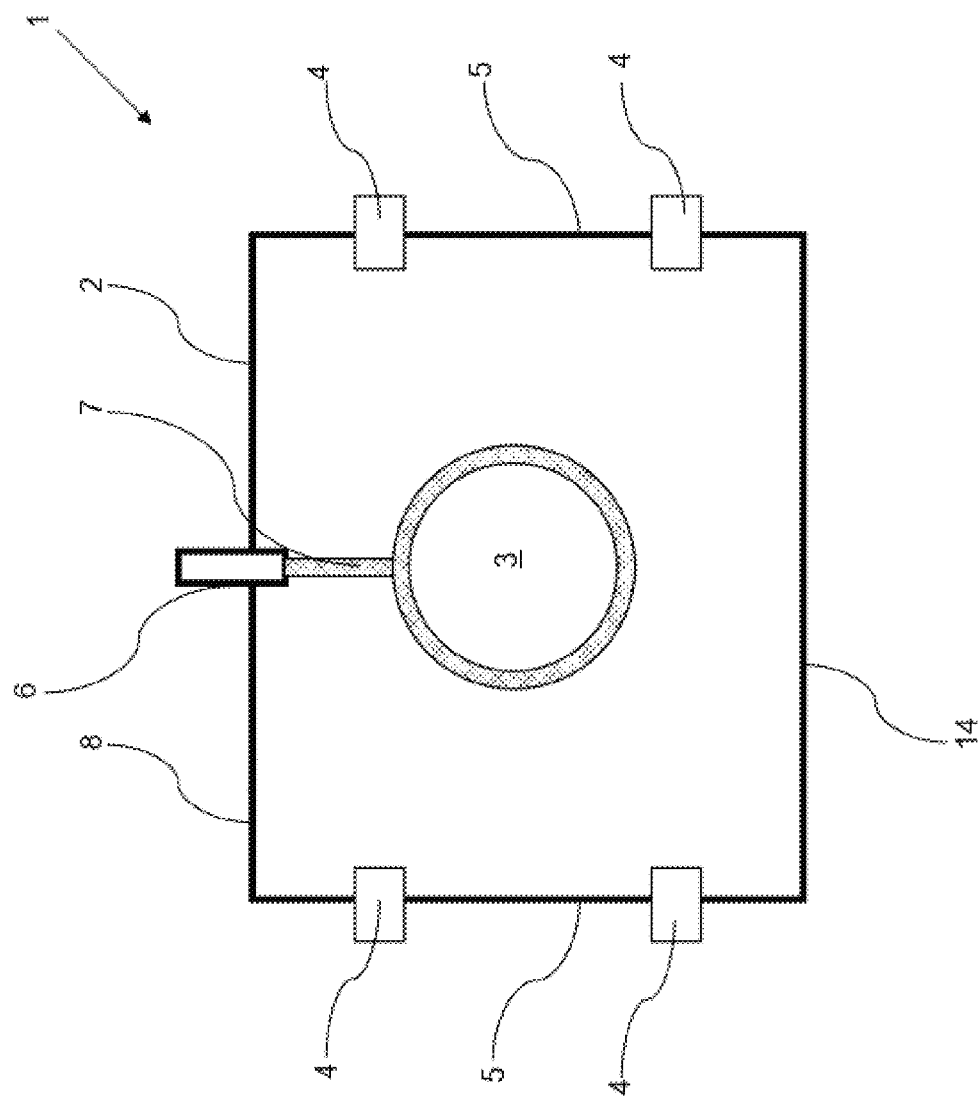

APPARATUS FOR FORMING GLASS TUBES, A HEATING CHAMBER AND A PROCESS FOR THE MANUFACTURE OF AN APPARATUS FOR FORMING GLASS TUBES

CROSS REFERENCE TO RELATED APPLICATIONS

This application claims benefit under 35 USC § 119 of European Application 20183650.9 filed Jul. 2, 2020, the entire contents of which are incorporated herein by reference.

BACKGROUND

1. Field of the Invention

The present invention relates to an apparatus for forming glass tubes comprising a heating chamber, a Danner-pipe and at least one heating device, wherein the Danner-pipe and the at least one heating device are arranged inside of the heating chamber, and wherein the Danner-pipe is inclined with respect to a horizontal plane by a Danner-angle. Further, the present invention relates to a heating chamber for an apparatus for forming glass tubes comprising two sidewalls, wherein at least one heating device is arranged on at least one of the sidewalls.

2. Description of Related Art

Glass tubes are commonly produced by so-called continuous tube drawing processes, wherein the molten glass is directly formed into a glass tube. The continuous tube being produced by these processes is cut into smaller pieces, which are then processed further, for example into a pharmaceutical package for storing pharmaceutical products.

One of these continuous tube drawing processes is the Danner-process. In the Danner-process the molten glass is directed from a feeder onto the Danner-pipe which is arranged in a heating chamber comprising a heating device. The Danner-pipe is a rotating cylinder that is inclined with respect to the horizontal plane such that the molten glass flows over the Danner-pipe due to gravitation. To prevent the glass tube from collapsing, compressed air is blown through openings of the Danner-pipe.

The geometry and quality of the glass tube can be controlled by varying the drawing speed and/or the blow pressure. Further parameters such as the glass compound, the temperature of the molten glass, the surrounding temperature in the heating chamber etc. have an impact on the quality of the produced glass tubes. Especially glass tubes for pharmaceutical packaging have to fulfil high quality standards, which are difficult to obtain with the known apparatuses for forming glass tubes.

SUMMARY

Embodiments of the present invention address the problem of improving and further developing an apparatus and a heating chamber for forming glass tubes such that a high-quality glass tube can be provided.

In an embodiment, the present invention provides an apparatus for forming glass tubes comprising a heating chamber, a Danner-pipe and at least one heating device, wherein the Danner-pipe and the at least one heating device are arranged inside of the heating chamber, and wherein the Danner-pipe is inclined with respect to a horizontal plane by a Danner-angle, characterized in that the heating device is inclined with respect to the horizontal plane by a heating-angle In a further embodiment, the present invention provides a heating chamber for an apparatus comprising two sidewalls, wherein at least one heating device is arranged on at least one of the sidewalls, characterized in that the heating device is inclined with respect to a horizontal plane by a heating-angle.

In a further embodiment, the present invention provides a process for the manufacture of an apparatus, wherein a heating chamber comprising a floor, a ceiling and two sidewalls is mounted and wherein a Danner-pipe and at least one heating device are arranged inside of the heating chamber, wherein the Danner pipe is inclined with respect to a horizontal plane by a Danner-angle and wherein the heating device is inclined with respect to the horizontal plane by a heating-angle, wherein the Danner-angle is in the range of 1° to 45°, preferably 2° to 25°, more preferably 3° to 20°, most preferably 4° to 14°, most preferably 5° to 11°, and wherein the heating-angle is in the range of 1° to 45°, preferably 2° to 25°, more preferably 3° to 20°, most preferably 4° to 14°, most preferably 5° to 11°

Since the inclination of the Danner-pipe has an impact on the glass flow properties of the molten glass it represents a crucial parameter for the glass forming process. The inventors have realized that it is advantageous to match the heating-angle of the heating device with the inclination of the Danner-pipe. Therefore, a higher temperature stability is achieved within the heating chamber, which is essential for forming high quality glass tubes. A further advantage is that a fastest possible adaption of the temperature gradient can be achieved, this also results in a glass tube fulfilling higher quality standards. In other words, the apparatus according to the invention makes it possible that the glass coating on the Danner-pipe is evenly charged with heat energy, which results in an optimal heat transfer from the heating device to the glass melt. In case that more than one heating device are arranged, the heating-angle of these heating devices can differ from each other or can be the same. Furthermore, at least one heating device has to be inclined with respect to the horizontal plane, whereas further heating devices could be parallel to the horizontal plane.

The term "Danner-angle" refers to the angle enclosed by the rotation axis of the Danner-pipe and the horizontal plane.

The term "heating-angle" refers to the angle enclosed by the extending direction of the heating device, for example defined by a longitudinal axis of the heating device, and the horizontal plane.

The term "horizontal plane" refers to a plane having a normal vector that is parallel to the local gravity direction.

The term "alignment-angle" refers to the angle enclosed by the longitudinal axis of a heating element and the horizontal plane. If the heating element is a gas burner, the longitudinal axis of the heating element is defined by the outlet opening for the flame of the gas burner.

The term "sidewall" refers to the at least essentially vertical extending walls of the heating chamber, which are positioned at least essentially parallel to the rotation axis of the Danner-pipe.

In a preferred embodiment, the Danner-angle is in the range of 1° to 45°, preferably 2° to 25°, more preferably 3° to 20°, most preferably 4° to 14°, most preferably 5° to 11°. An advantage of such a Danner-angle is that the drawing speed of the molten glass is in the ideal range for glass tube forming.

According to another embodiment, the heating-angle is in the range of 1° to 45°, preferably 2° to 25°, more preferably 3° to 20°, most preferably 4° to 14°, most preferably 5° to 11°. A heating-angle within this range is advantageous since it can be matched with the Danner-angle.

In a preferred embodiment, the heating-angle is in the range of the Danner-angle minus 4° to the Danner-angle plus 4°, preferably the Danner-angle minus 3° to the Danner-angle plus 3°, more preferably the Danner-angle minus 2° to the Danner-angle plus 2°, most preferably the Danner-angle minus 1° to the Danner-angle plus 1°, most preferably the heating-angle equals the Danner-angle. By choosing a heating-angle in consideration of the Danner-angle the temperature consistency within the heating chamber is further improved.

According to another embodiment, the inclination of the heating device is variable. The inclination, i.e., the heating-angle, can for example be varied if the heating device comprises a mechanism that allows adjusting and fixating the heating device to the wall of the heating chamber under different heating-angles. A heating device comprising a variable inclination is advantageous because the best heating-angle can be chosen with respect to the Danner-pipe.

In a preferred embodiment, the heating device comprises at least two heating elements, which are arranged in a row, preferably arranged on a straight line. If the heating elements are arranged in a straight line, this line defines the extending direction of the heating device. An advantage of such a heating device is that it is easy to manufacture. Further, such a heating device can be positioned exactly with regard to the Danner-pipe. The heating elements can for example be arranged on a common rail.

According to another embodiment, at least one of the heating elements, preferably at least two of the heating elements, more preferably at least four of the heating elements, most preferably all of the heating elements, is inclined with respect to the horizontal plane by an alignment-angle, wherein the alignment-angle is in the range of 0° to 20°, preferably 1° to 15°, more preferably 3° to 10°, most preferably 5° to 7°. Especially if the heating elements are gas burners such a configuration is advantageous since it can be avoided that the flame direction of the gas burners points directly to the Danner-pipe. By arranging the heating elements within the alignment-angle the heating device is further positioned under consideration of the Danner-pipe, such that the temperature consistency is further improved and the Danner-pipe can be indirectly heated. It is noted that the alignment-angle can be different for different heating elements.

In a preferred embodiment, the heating elements are gas burners. Using gas burners is advantageous since they are cheap and easy to install, position and control.

According to another embodiment, the heating chamber comprises two sidewalls and wherein at least one heating device is arranged at each sidewall of the heating chamber, preferably wherein at least two heating devices are arranged at each sidewall of the heating chamber. Providing at least one heating device at each sidewall of the heating chamber leads to a better heating consistency within the heating chamber, especially if two heating devices are arranged— preferably above each other—at each sidewall.

In a preferred embodiment, the heating chamber comprises a ceiling with an inlet for molten glass and wherein the gas burners of the heating device being arranged nearest to the inlet are positioned such that the flame direction of the gas burners points towards the ceiling of the heating chamber. Such a design enables a further possibility to control the heat within the heating chamber, such that the molten glass will not be cooled down when it enters the heating chamber.

According to another embodiment, the heating chamber comprises a ceiling and a ceiling-heating device. The ceiling-heating device could be arranged directly above the Danner-pipe. Furthermore, the ceiling-heating device can comprise several heating elements, for example gas burners. The heating elements could be arranged in a straight line. Providing a ceiling-heating enables a further control of the heat inside the heating chamber.

In a preferred embodiment, the heating chamber comprises a floor and wherein a floor-cooling for the floor is arranged. For example, at least one cooling channel comprising a cooling medium can be arranged in the floor. As a cooling medium could be used air or another gas, which is blown through the cooling channel, or a liquid, for example water, could be guided through the cooling channel.

In a preferred embodiment, the number of heating elements arranged on at least one heating device arranged on one sidewall is equal or different compared to the number of heating elements arranged on a heating device arranged on the opposite sidewall. An equal number of heating elements might be favorable if the molten glass flows onto the Danner pipe in a centric manner. A different number of heating elements might be favorable if the molten glass flows onto the Danner pipe in a non-centric manner. By adjusting the number of heating elements arranged on a heating device for each sidewall individually the temperature of the molten glass flowing onto the Danner-pipe can be reliably controlled. This leads to a glass tube with exactly defined geometry that therefor fulfills high quality standards.

According to another embodiment, the heating-angle is in the range of the Danner-angle minus 4° to the Danner-angle plus 4°, preferably the Danner-angle minus 3° to the Danner-angle plus 3°, most preferably the Danner-angle minus 2° to the Danner-angle plus 2°, most preferably the Danner-angle minus 1° to the Danner-angle plus 1°, most preferably the heating-angle equals the Danner-angle. By choosing the heating-angle under consideration of the Danner-angle the temperature of the molten glass flowing over the Danner-pipe can be reliably controlled. This leads to a glass tube with exactly defined geometry that therefor fulfills high quality standards.

There are several ways how to design and further develop the teaching of the present invention in an advantageous way. To this end, it is to be referred to the following explanation of preferred examples of embodiments of the invention, illustrated by the drawing on the other hand. In connection with the explanation of the preferred embodiments of the invention by the aid of the drawing, generally preferred embodiments and further developments of the teaching will be explained.

BRIEF DESCRIPTION OF THE DRAWINGS

FIG. 1 shows in a schematic cross-sectional side view an embodiment of an apparatus for forming glass tubes, FIG. 2 shows in a schematic cross-sectional front view the embodiment of FIG. 1.

DETAILED DESCRIPTION

Figure 3B:
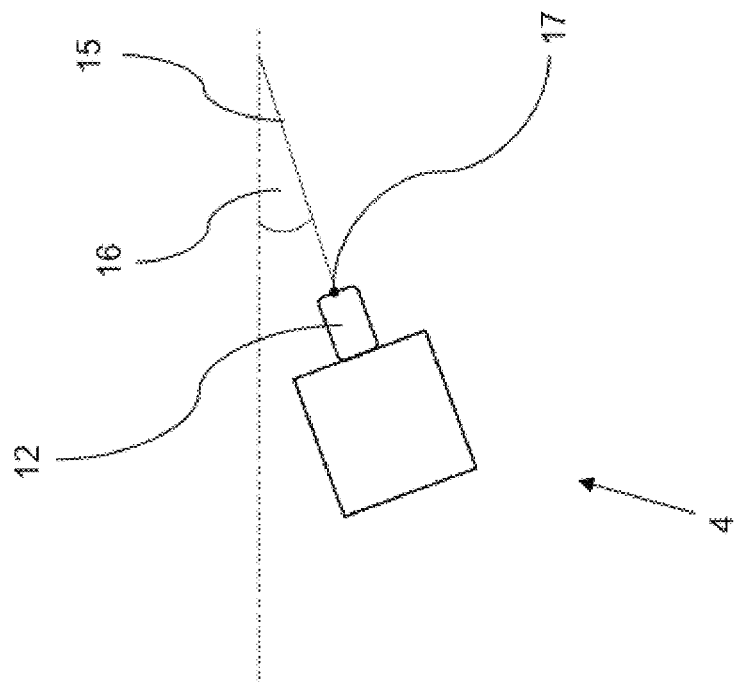
FIG. 3b shows a schematic cross-sectional view of a heating device, and FIG. 4 a block diagram of an embodiment of a process for the manufacture of an apparatus for forming glass tubes.

FIGS. 1-2 show an embodiment of an apparatus 1 for forming glass tubes. The apparatus 1 comprises a heating chamber 2, a Danner-pipe 3 and four heating devices 4. It is also possible that at least one, preferably two heating devices 4 are arranged. The heating devices 4 are arranged on the sidewalls 5 of the heating chamber 2. Further, an inlet 6 for molten glass 7 is arranged in the ceiling 8 of the heating chamber 2.

The molten glass 7 enters the heating chamber 2 via the inlet 6 and flows onto the Danner-pipe 3, which is rotating around its rotation axis 9. Since the rotation axis 9 is inclined with respect to a horizontal plane 10 by the Danner-angle 11 the molten glass 7 flows over the rotating Danner-pipe 3 through which air is blown to prevent the molten glass 7 from collapsing, when it is drawn from the surface of the Danner-pipe 3.

The heating devices 4 each comprise several heating elements 12, preferably gas burners, being arranged in a straight line on a rail 13. A skilled person understands that the heating elements 12 can also be arranged on a different component than a rail or can for example be directly fixed to the sidewall 5. FIG. 1 further shows that the heating devices 4 are each inclined with respect to the horizontal plane 10 by a heating-angle 13, i.e., the longitudinal axis 20 of each heating device and the horizontal plane 10 enclose the heating-angle 13. In this embodiment, the heating-angle 13 equals the Danner-angle 11. Although it is also possible that the heating-angle 13 differs from the Danner-angle 11.

The heating elements 12 of the upper heating devices 4 can be arranged such that the flame direction points upwards. This prevents a direct thermal exposure of the molten glass 7. Furthermore, the ceiling 8 is heated which prevents the condensation of evaporation products on the ceiling and hence the dropping of the condensate onto the Danner-pipe 3

It is also possible, that the heating chamber 2 comprises a not shown floor-cooling for the floor 14 of the heating chamber 2. The floor-cooling can for example be a cooling channel through which a cooling medium is flowing.

Figure 3A:
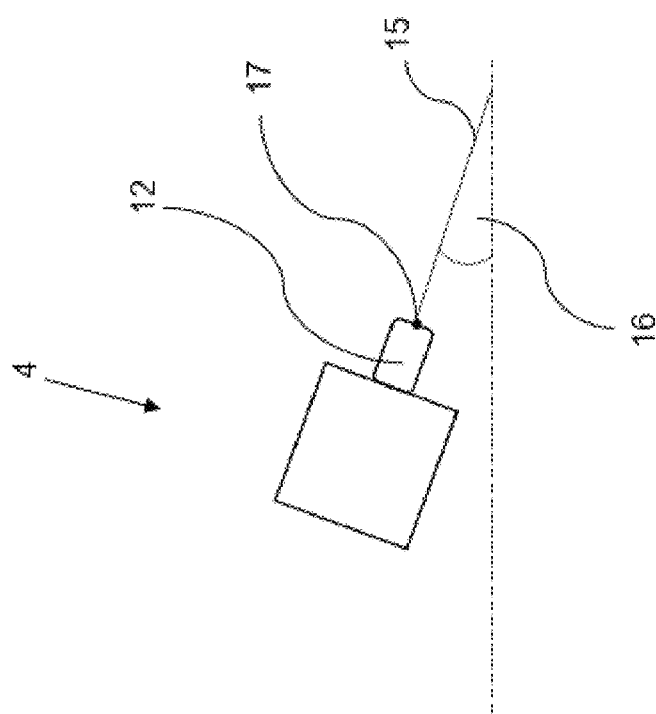
FIG. 3a shows a schematic cross-sectional view of a heating device.

FIGS. 3a and 3b respectively show a cross-sectional view through an embodiment of heating device 4. The heating element 12 is a gas burner having an outlet opening 17. The heating element 12 is inclined with respect to the horizontal plane 10, i.e., the longitudinal axis 15 of the heating element 12 and the horizontal plane 10 enclose the alignment-angle 16. In FIG. 3a the heating element 12 is inclined with respect to the horizontal plane 10 such that it points in the direction of the floor 14. In FIG. 3b the heating element 12 is inclined with respect to the horizontal plane 10 such that it points in the direction of the ceiling 8. Hence, a skilled person understands that the heating element 12 can be arranged such that it points to the floor 14 or to the ceiling 8. Depending on the geometry of the apparatus, some of the heating elements 12 can point to the ceiling 8, while others point to the floor 14.

Figure 4:
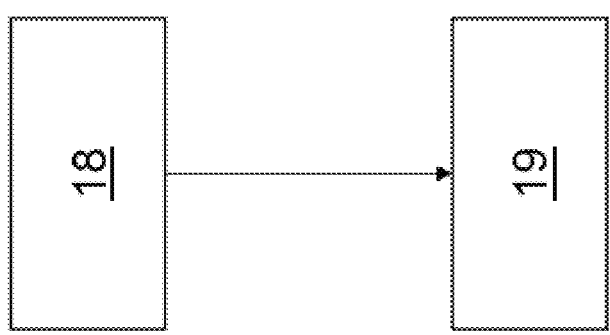

FIG. 4 shows a block diagram of an embodiment of a process for the manufacture of an apparatus 1 for forming glass tubes. Wherein during a step 18 a heating chamber comprising a floor, a ceiling and two sidewalls are mounted and wherein during a step 19 a Danner-pipe and at least one heating device are arranged inside of the heating chamber, wherein the Danner-pipe is inclined with respect to a horizontal plane by a Danner-angle and wherein the heating device is inclined with respect to the horizontal plane by a heating-angle. The Danner-angle is in the range of 10 to 45°, preferably 2° to 25°, more preferably 3° to 20°, most preferably 4° to 14°, and the heating-angle is in the range of 1° to 45°, preferably 2° to 25°, more preferably 3° to 20°, most preferably 4° to 14°, most preferably 5° to 11°. A skilled person understands that the steps 18 and 19 can also be carried out in reverse order and/or that other steps can be carried out before, after and/or in between the steps 18 and 19.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims.

Although specific terms are employed herein, they are used in a generic and descriptive sense only and not for purposes of limitation.

LIST OF REFERENCE SIGNS 1 apparatus
2 heating chamber
3 Danner-pipe
4 heating device
5 sidewall
6 inlet
7 molten glass
8 ceiling
9 rotating axis
10 horizontal plane
11 Danner-angle
12 heating element
13 heating-angle
14 floor
15 longitudinal axis (heating element)
16 alignment-angle
17 outlet opening
18 step
19 step
20 longitudinal axis (heating device)

What is claimed is:

1. An apparatus for forming glass tubes, comprising:
a Danner-pipe;
a heating device; and
a heating chamber having the Danner-pipe and the heating device arranged therein,
wherein the Danner-pipe is inclined with respect to a horizontal plane by a Danner-angle, wherein the heating device is inclined with respect to the horizontal plane by a heating-angle, wherein the heating device comprises at least two heating elements which are arranged in a row, wherein the heating elements are gas burners, and wherein the gas burners are adjacent to the Danner-pipe.

2. The apparatus of claim 1, wherein the Danner-angle is in a range of 1° to 45°.

3. The apparatus of claim 2, wherein the Danner-angle is in a range of 5° to 11°.

4. The apparatus of claim 1, wherein the heating angle is in a range of 1° to 45°.

5. The apparatus of claim 4, wherein the heating angle is in a range of 5° to 11°.

6. The apparatus of claim 1, wherein the Danner-angle and/or the heating angle is in a range of 2° to 25°.

7. The apparatus of claim 1, wherein the Danner-angle and/or the heating angle is in a range of 3° to 20°.

8. The apparatus of claim 1, wherein the Danner-angle and/or the heating angle is in a range of 4° to 14°.

9. The apparatus of claim 1, wherein the heating-angle is in a range of the Danner-angle minus 4° to the Danner-angle plus 4°.

10. The apparatus of claim 1, wherein the heating-angle is in a range of the Danner-angle minus 3° to the Danner-angle plus 3°.

11. The apparatus of claim 1, wherein the heating-angle is in a range of the Danner-angle minus 2° to the Danner-angle plus 2°.

12. The apparatus of claim 1, wherein the heating-angle equals the Danner-angle.

13. The apparatus of claim 1, wherein the heating-angle is variable.

14. The apparatus of claim 1, wherein the elements are arranged in a straight line.

15. The apparatus of claim 14, wherein the two heating elements are inclined with respect to the horizontal plane by an alignment-angle in a range of 0° to 20°.

16. The apparatus of claim 15, wherein the alignment-angle is in the range of 5° to 7°.

17. The apparatus of claim 1, wherein the heating chamber comprises two sidewalls, the heating device is arranged at a first of the two sidewalls.

18. The apparatus of claim 17, further comprising a second heating device arranged at a second of the two sidewalls, the second of the two sidewalls being opposite the first of the two sidewalls.

19. The apparatus of claim 18, wherein the heating device comprises one or more first heating elements and the second heating device comprises one or more second heating elements, wherein the one or more first heating elements are equal in number or different in number than the one or more second heating elements.

\* \* \* \* \*